United States Patent

[11] 3,557,682

| [72] | Inventor | Frederick Z. Goosman |
| | | 200 E. 57th St., New York, N.Y. 10022 |
| [21] | Appl. No. | 779,972 |
| [22] | Filed | Nov. 29, 1968 |
| [45] | Patented | Jan. 26, 1971 |

[54] AUTOMATIC FOOD COOKING AND DISPENSING APPARATUS
6 Claims, 11 Drawing Figs.

[52] U.S. Cl. .................................................. 99/327,
99/335, 99/353, 99/355, 99/386, 99/390, 99/391, 99/423, 99/443
[51] Int. Cl. ...................................................... A47j 27/62
[50] Field of Search ............................................ 99/327,
334, 335, 353, 355, 372, 373, 423, 424, 443, 386, 387

[56] References Cited
UNITED STATES PATENTS

| 1,881,126 | 10/1932 | Parr | 99/353 |
| 1,912,765 | 6/1933 | Erni | 99/353 |
| 2,151,401 | 3/1939 | Belcher | 99/387X |
| 2,208,651 | 7/1940 | Wallace | 99/355X |
| 3,064,555 | 11/1962 | Nanna | 99/353 |
| 3,340,790 | 9/1967 | Simjian | 99/387X |
| 3,413,911 | 12/1968 | Phelan et al. | 99/355 |

*Primary Examiner*—Billy J. Wilhite
*Attorney*—Borst & Borst

ABSTRACT: The application discloses an automatically controlled cooking and dispensing apparatus for hamburger and the like. A timer device controls air valves for starting and reversing a meat conveyor which is enabled by an air cylinder and a baffle member to pick up patties of the meat product one at a time. The air valves are controlled during the timing period to place a pair of heating elements in cooking position and at the end of the period to withdraw the elements therefrom. Optional means are provided for automatically positioning the meat supply cylinders in conveyor pickup during operation of the apparatus.

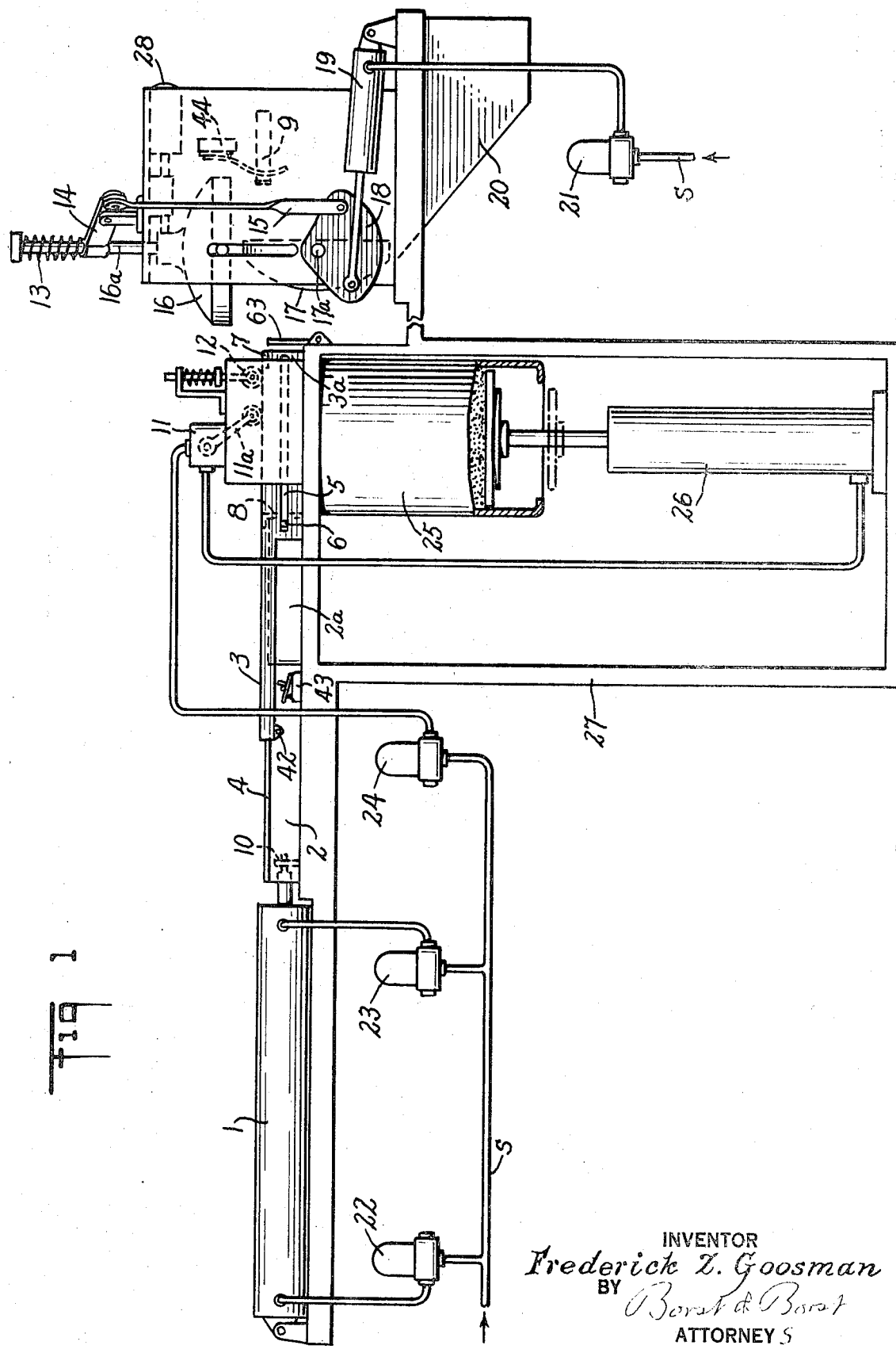

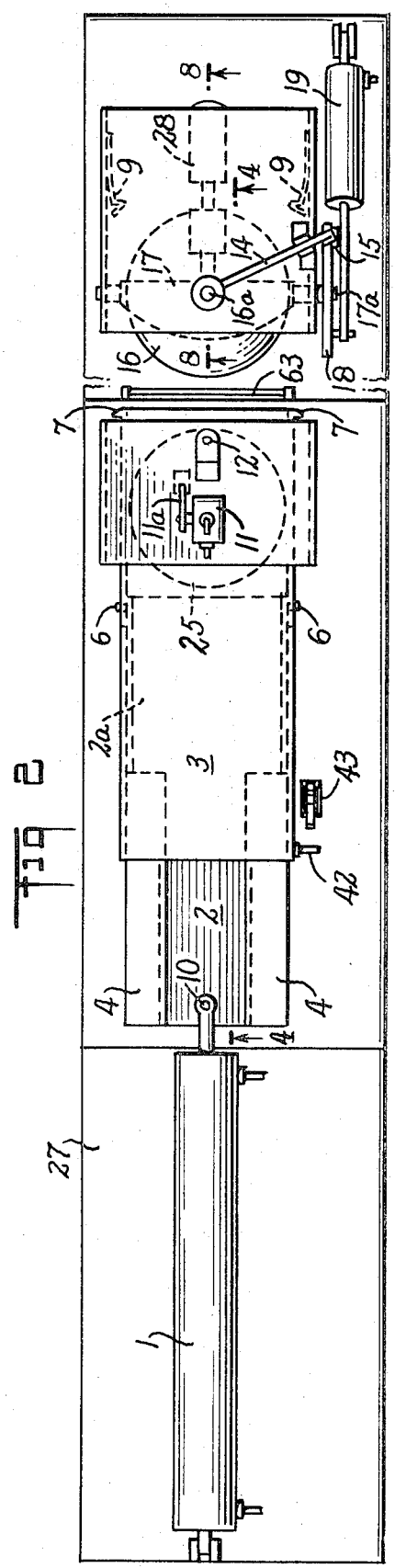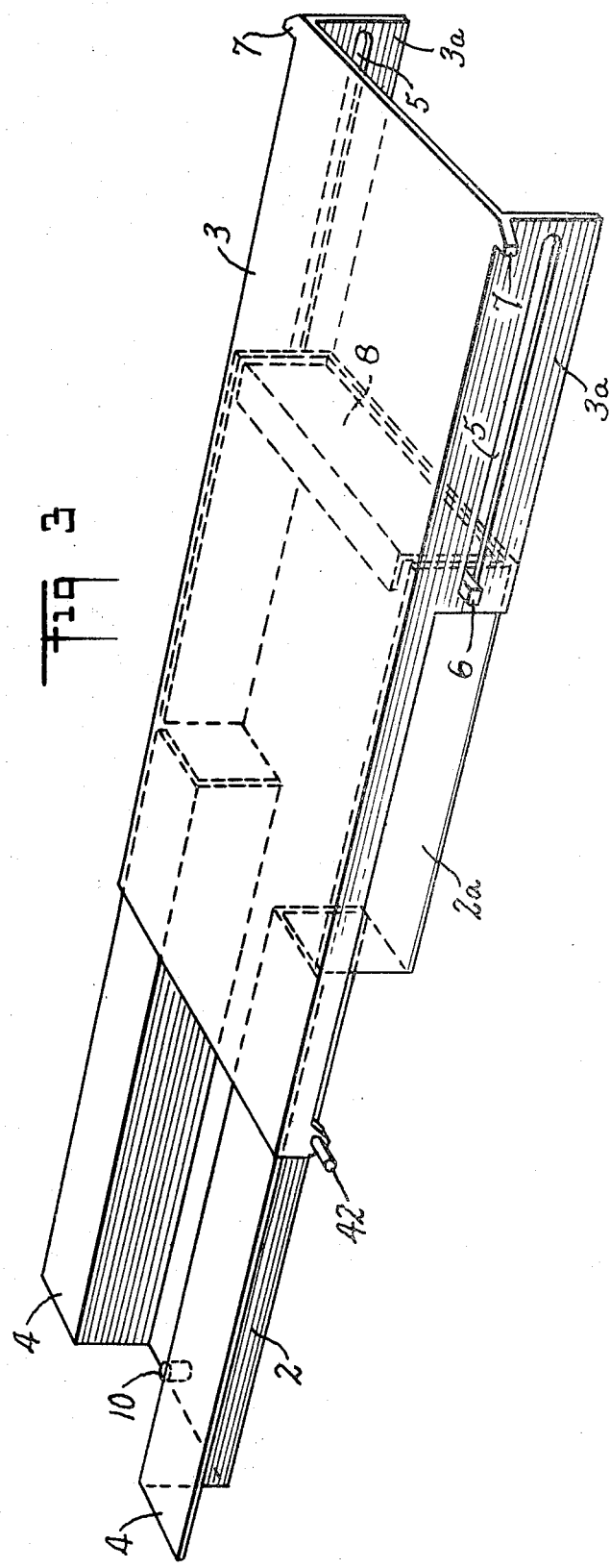

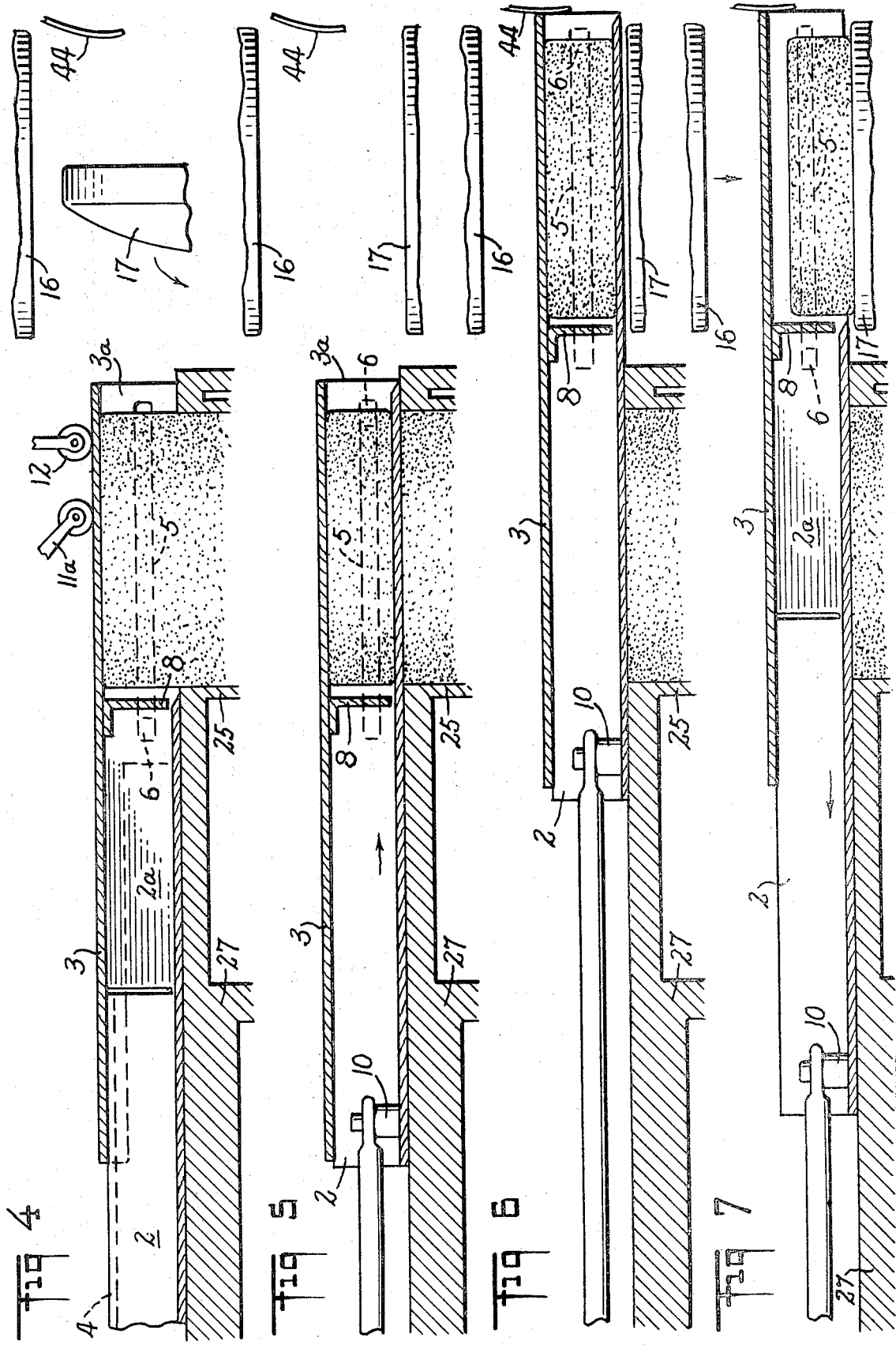

3,557,682

AUTOMATIC FOOD COOKING AND DISPENSING APPARATUS

The application relates to food treating and dispensing apparatus.

According to the invention apparatus is provided for placing in the path of a conveyor incremental amounts of a food product, such as hamburger and the like for cooking purposes. The cooking is effected by heating elements positioned for that purpose and also for dispersing the cooked product, such positioning being achieved automatically in accordance with controls established by the conveyor. Special means are provided for introducing the product to the conveyor, placing it on positioned cooking elements and dispensing the product after cooking. Such means may include optionally supply cylinders which are rotated by automatic controls to a position for pickup by the individual cylinders One object of the invention is to provide a new and improved apparatus for heating and dispensing food.

Other objects and advantages of the invention may be appreciated on reading the following description of one or more of its embodiments as illustrated in the accompanying drawings, in which:

FIG. 1 is a side view of the entire basic unit;

FIG. 2 is a plan view looking down on basic unit;

FIG. 3 is an enlarged detail in perspective of the two parts that form the forming, cutting and transfer vehicle for the patty;

FIGS. 4, 5, 6 and 7 show the operation of the FIG. 3 unit in longitudinal section, taken on line 4–4 of FIG. 2;

Figure 8:
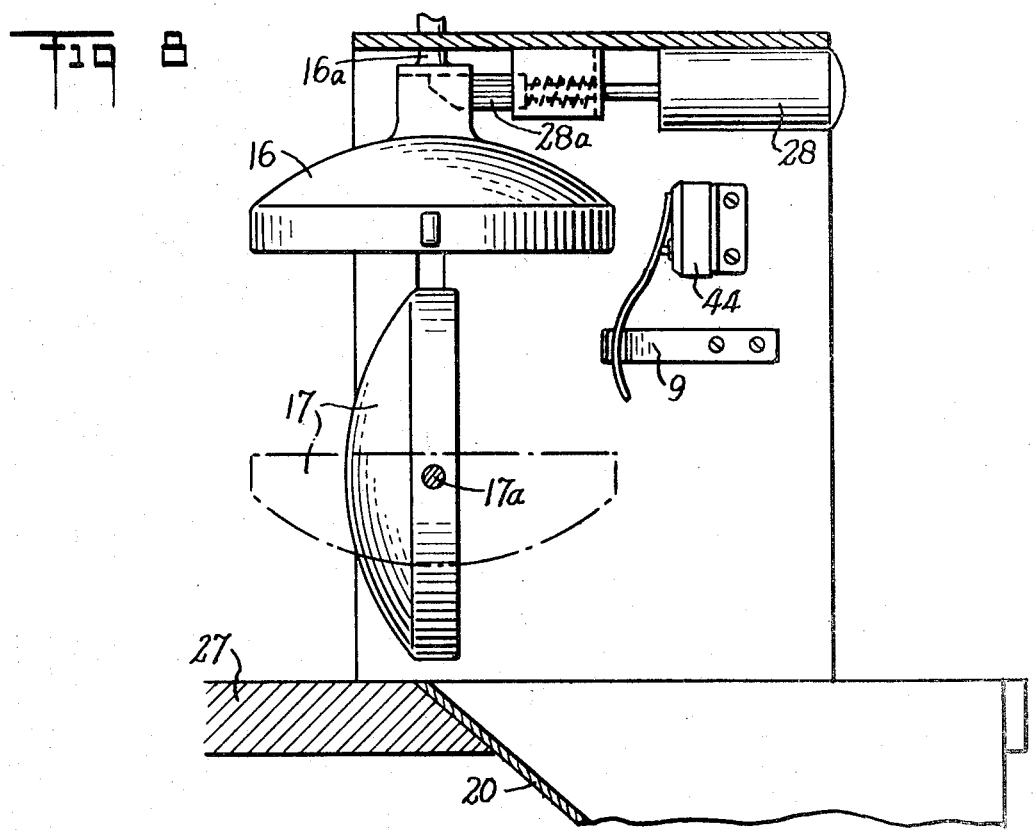
FIG. 8 is a fragmentary enlargement in longitudinal section of the cooking chamber giving various details, taken on line 8–8 of FIG. 2.

Motive power for this equipment can be by any means. However, if a battery of these units are made in a single installation, air operation becomes feasible and it is the method of operation shown.

Referring to the drawings the piston of main cylinder 1 is connected to patty conveyor 2 which is provided with a top flange 4 and an enlarged open pan portion 2a. A slidable cover 3 serving as a patty cover is supported on the flange 4 of the conveyor 2 as a track therefor and has laterally depending skirts 3a in which there are formed key slots 5 in which are disposed keys 6 projecting from the pan portion 2a. Tabs 7 are laterally secured to the top front corner of the skirts 3a and are adapted to engage spring clips 9 for a purpose later to be explained. The underside of the cover 3 is provided with a dividing partition 8 for scraping off any hamburger or other meat product picked up by the conveyor 2 and depositing the product onto cooking element 17 which is shown, for example, in FIG. 8.

As shown in FIG. 1, the piston of cylinder 1 is connected to post 10 located on the floor of the conveyor 2, Its forward movement is controlled by solenoid operated, air valve 22 which in its normal state is vented to atmosphere and in its electrically closed state is in communication with air supply S so that it is enabled to push the piston from left to right in cylinder 1, as shown in the drawings. Air valve 23, which is also solenoid operated serves to reverse the piston in cylinder 1 after it has completed its forward travel to the point where tabs 7 are in engagement with the flexible clips 9 at the extreme forward end of the device. This is due to the fact that in its normal state it is connected to the air supply S and is vented to atmosphere when electrically energized.

Again as particularly shown in FIG. 1 the device includes a solenoid operated, air valve 24: This valve is also normally open to atmosphere and connected to the air supply S when energized. It communicates with air valve 11 controlled by lever 11a and thence with air cylinder 26 in housing 27. The latter is arranged to raise and lower a patty supply elevator in cylinder 25 within the housing so as, for example, to place a patty in the path of the conveyor 2. The thickness of the patty is controlled by the lever 11a which periodically shuts off the air cylinder as the forward end of the cover 3 is upwardly tilted against the lever 11a due to the force of the meat supply on its underside. See FIG. 4. The tilting of the cover in this manner is effectuated against adjustable spring roller 12 which thereby assures the proper density of the extended patty.

The lower cooking element 17 is placed in dumping position relative to, as shown in full lines in FIG. 8, the chute 20 on its rotating shaft 17a eccentrically mounted on which is cam 18. The element is normally in this position but is withdrawn therefrom by spring return cylinder 19 acting on the cam and which is in turn controlled by solenoid operated air valve 21. The latter is normally in communication with the air supply S but is vented to atmosphere on being energized so as to allow the return of the cam controlling piston in the cylinder 19.

In the extreme forward position of the device contact is made between the conveyor and normally closed microswitch 44, (FIG. 6) which on such contact is momentarily opened to change the state of a holding circuit, as explained below, and thereby change the state of valves 22 and 23 to cause the conveyor to reverse. The cover 3 is at this stage held stationary due to the engagement between element 7 and clip 9, such engagement having been effected at the extreme forward point of travel of the conveyor 2 and cover 3 during which the key elements 6 are in engagement with the right-hand end of the key slots 5 in the cover. As the conveyor 2 retreats, the partition 8 depending from the now stationary cover 3 scrapes off the patty onto the cooking element 17. See FIG. 7. Preferably, a spring (not shown) pressed scraper member 63 pivotally mounted on the housing 27 serves to scrape the patty from the top of the cover 3. The scraper member is pushed to a horizontal position by the conveyor pan portion 2a in its forward travel to the cooking elements and regains its upright position, as shown in FIG. 1, when the pan retracts to its position over the cylinder 25. Further rearward movement of the conveyor to the point where the key elements contact the left-hand end of the slots 5 releases the cover 3 from the holding clips 9 causing it to retreat together with the conveyor, the stationary scraper 63 serving then to scrap off the excess meat substance from the top of the rearwardly moving cover. Side tabs 42 on the cover 3 then are brought into contact with microswitch 43, as shown in FIG. 1, which is normally open, causing the switch to close momentarily and actuate solenoid 28 to withdraw spring pressed stop 28a thus allowing the top cooking element 16 to drop onto the top of the patty supported on the cooking element 17, as shown in FIG. 7, for cooking the patty on both sides. The cooking element 16 is raised by pivotal link 14 against spring 13 mounted on vertical arm 16a which is connected to the element as shown in FIG. 8. As shown in the drawings the pivotal position of link 14 is controlled by cam operated lever 15 so that when the cam controlled cooking element 17 is dumped as valve 21 connects cylinder 19 to the air supply on-off current condition, the cooking element 16 is automatically raised until it is allowed to descend into cooking position by the coaction of microswitch 43 and solenoid valve 28 as the carrier and cover members retreat to their starting positions.

Figure 9:
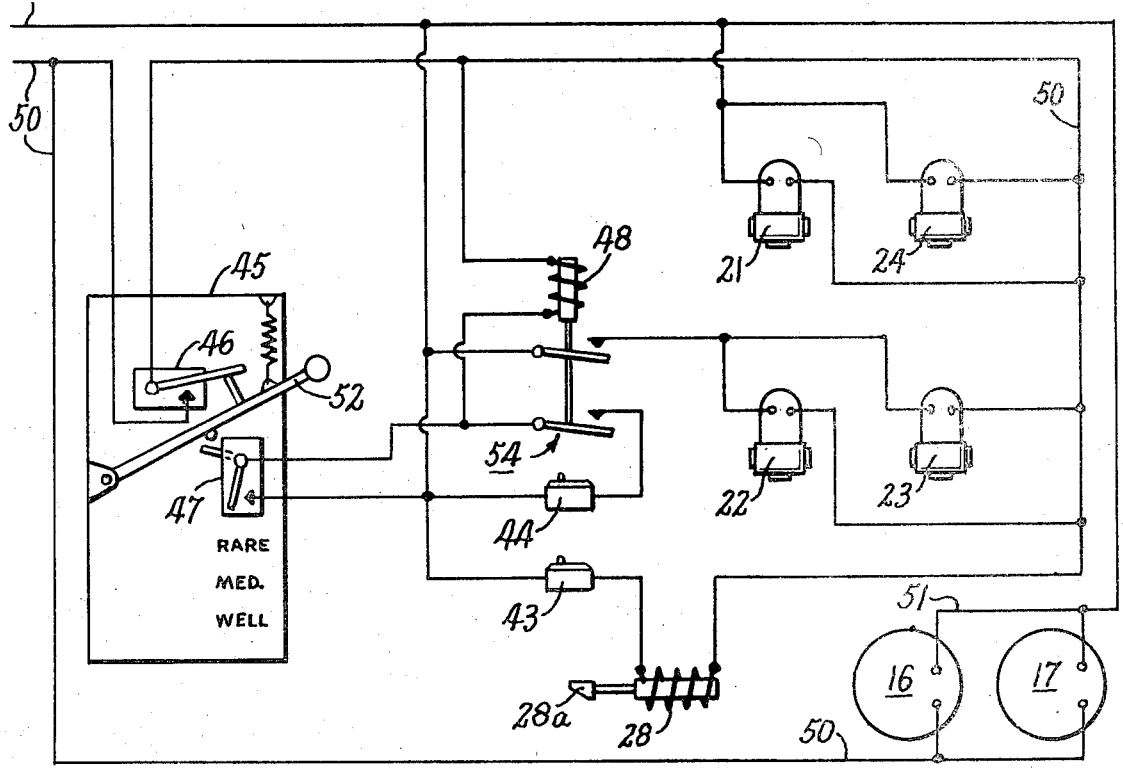
FIG. 9 is the basic control diagram for the unit.

The current diagram in FIG. 9 illustrates the functioning of the automatic hamburger cooking and supply apparatus. The cooking elements 16 and 17 are in continuous connection in supply lines 50 and 51. The solenoid valves are controlled by microswitch 46 in the timer 45 which is activated by spring arm 52 selectively into rare, medium and well done cooking positions. On depressing the arm 52 switch 47 is momentarily placed into On position so as to place the solenoid coil 48 across the holding and close holding switch 54. This action energizes solenoid valves 22 and 23 to cause the conveyor to travel in the forward direction. Depressing the arm 52 closes switch 46 in the holding circuit and at the same time energizes valve 21 for placing the element 17 in cooking position and valve 24 to raise the patties in cylinder 25 to conveyor pickup position. When the conveyor contacts microswitch 44 at the end of the forward travel the holding circuit is opened, and the solenoids 22 and 23 change state to start reversing the conveyor and the placement of a patty on the element 17. Further rearward travel of the conveyor causes actuation of the microswitch 43 to actuate solenoid 28 for dropping the cooking element 16 into cooking position. When the timer arm is returned to its normally closed position, the element 17 is rotated into dump position by the state of valve 21, which automatically and positively raises the cooking element 16. The forward travel of the conveyor according to the state of valves 22 and 23 and the operation of the elevator cylinder by piston 26 according to the state of valve 24 will not resume until the timer arm 52 is again depressed.

Figure 10:
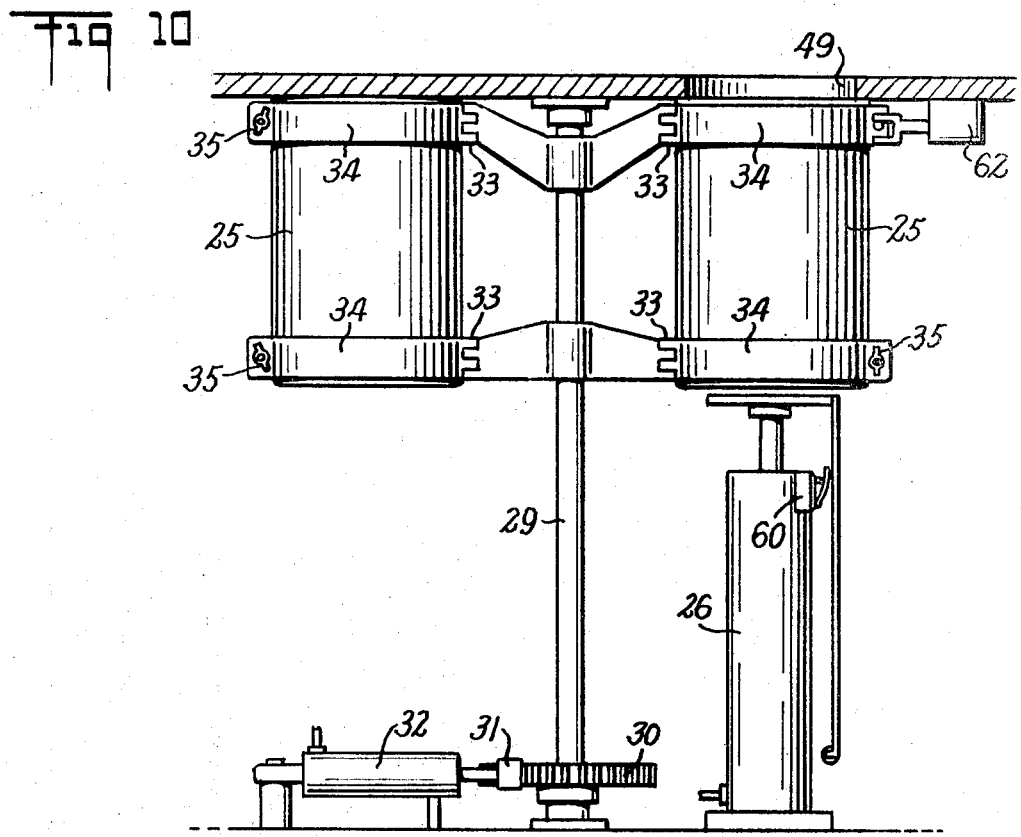
FIG. 10 is a detail showing multiple storage cylinders for material and the automatic-handling equipment for them.
Figure 11:
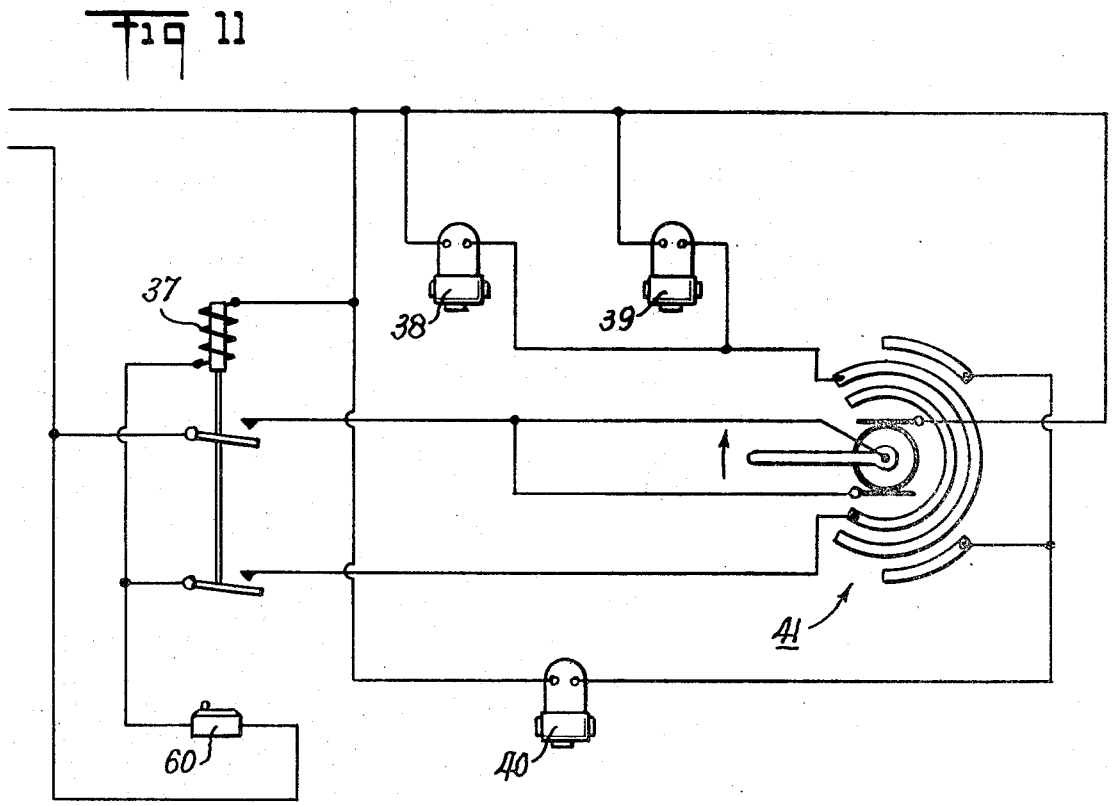
FIG. 11 is the additional wiring diagram required for automatic operation where multiple cylinders are used as part of the basic unit.

FIG. 10 and FIG. 11 show multiple material filled containers 25. Secured to rotating shaft 29 held in place by bearings at top and bottom, are two sets of brackets to hold containers 25. Each bracket has at its end a semicircular ring 34 hinged at 33 and having a locking device 35. A spring operated, centering and holding device 62 is adapted to engage top ring 34. This allows for easy removal and replacement of containers 25. At the lower end of shaft 29 is a ratchet gear 30 operated by cylinder 32 and head 31. Air cylinder 26 when fully extended has a following rod 36 that actuates the normally open microswitch 60. In FIG. 11 it will be noted that momentary contact of switch 60 closes relay 37 and this in turn actuates the motor operated contact switch 41. The switch 41 first closes a circuit to maintain the relay in a closed position. Then it actuates air valve 38, a three-way valve, normally in communication with an air supply for an up stroke, this air first having been controlled by the lever valve 11. Valve 38 now vents to atmosphere so as to preclude further up movement of the head. Valve 39 which is normally air closed with the down stroke of cylinder 26 vented to atmosphere, is now actuated with air being forced into the cylinder. This then brings cylinder 26 to fully retracted position. Further movement of switch 41 actuates air valve 40, which is normally closed with cylinder vented to atmosphere, to a position of air supply connected to cylinder 32. This then gives forward motion to spring return air cylinder 32, pushing ratchet engaging head 31 to turn the ratchet gear 30. It will repeat this movement a sufficient number of times to bring the cylinder 25 to directly line up with hole 49 under the path of the conveyor. To assist this alignment and hold it steady there would be two rollers which are actuated that would hold the end of the clamp 34 in place. At the end of a cycle contact switch 41 drops out the holding coil circuit of relay 37 and the circuits are all back to normal operation.

I claim:

1. A food-treating apparatus including a bottom conveyor, a cover therefor bearing a depending baffle, means for introducing a food product onto said conveyor and forward of said baffle, automatic means for causing said conveyor to travel in the forward and rearward directions in one cycle of operation, there being means for cooking said food product, and means including said baffle for placing the food product onto said cooking means, and automatic means for positioning said cooking means to receive said product and dispense the product for consumption.

2. An apparatus as defined in claim 1, wherein said introducing means includes a plurality of supply members, each member being adapted progressively to bring a portion of said food product onto said conveyor.

3. An apparatus as defined in claim 1, wherein the means for cooking said product is a pair of cooking elements one of which receives one side of said product with means for cooking the other side thereof on return movement of said conveyor.

4. An apparatus as defined in claim 3, wherein said first mentioned automatic means include an air cylinder, a solenoid operated valve connected to each end of said cylinder, a timer, a holding circuit connected to said timer, said circuit including said valves and a switch located in the path of said conveyor for controlling of said holding circuit and the state of said valves.

5. An apparatus as defined in claim 4, wherein one of said elements is adapted to change from a cooking position to a dump position, and valve means are connected to said timer for changing the position of said one element whereby the cooking time is selectively controlled by said timer.

6. An apparatus as defined in claim 3, wherein one of said elements is adapted to change from a cooking position to a dump position, a timer and valve means are connected to said timer for changing the position of said one element whereby the cooking time is selectively controlled by said timer.